No. 670,033. Patented Mar. 19, 1901.
W. L. PECKHAM & J. SILVIUS.
CREAM SEPARATOR.
(Application filed Sept. 10, 1900.)
(No Model.)
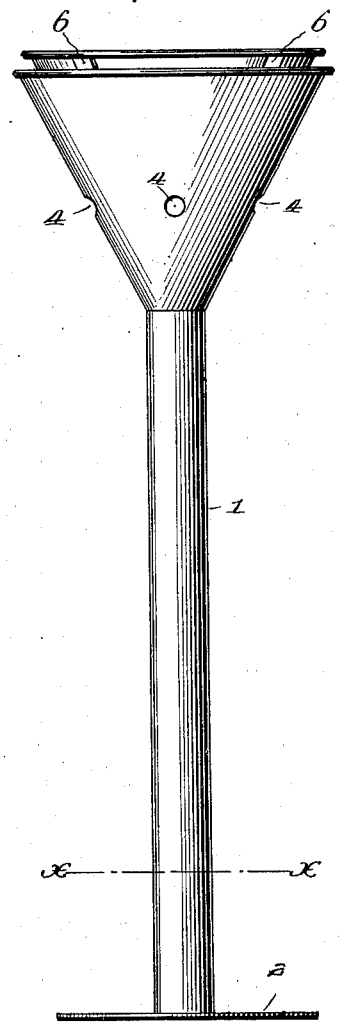
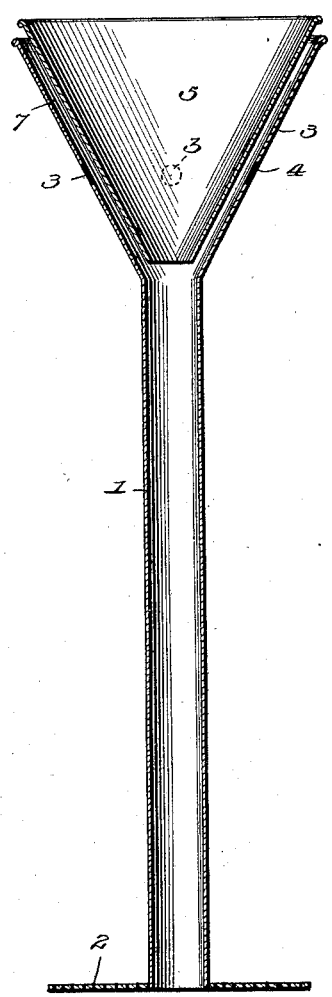
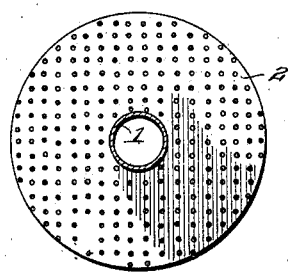
Witnesses
Harry S. Rohrer
Hubert D. Lawson
Inventors.
Willard L. Peckham,
John Silvius.
By Victor J. Evans Attorney

UNITED STATES PATENT OFFICE.

WILLARD L. PECKHAM AND JOHN SILVIUS, OF MARSHALLTOWN, IOWA, ASSIGNORS OF ONE-HALF TO J. M. PLUM, OF SAME PLACE.

CREAM-SEPARATOR.

SPECIFICATION forming part of Letters Patent No. 670,033, dated March 19, 1901.

Application filed September 10, 1900. Serial No. 29,624. (No model.)

*To all whom it may concern:*

Be it known that we, WILLARD L. PECKHAM and JOHN SILVIUS, citizens of the United States, residing at Marshalltown, in the county of Marshall and State of Iowa, have invented new and useful Improvements in Cream-Separators, of which the following is a specification.

This invention relates to new and useful improvements in cream-separators; and its primary object is to provide a device of simple construction which is adapted to quickly separate the cream from the milk.

A further object is to so construct the device as to employ air in addition to water for the purpose of separating.

To these ends the invention consists in providing a tube having a perforated disk at the lower end thereof. This tube is adapted to be inserted into the can containing the milk, and it is provided at its upper end with a funnel opening into the tube and which is inclosed by a second funnel having perforations therein, whereby air is admitted to the compartment formed between the funnels. An outlet is provided from the compartment at the lower end thereof into the tube before referred to, whereby the air will be drawn through the perforations and into the tube by suction caused by the admission of water to the device.

The invention also consists in certain features of construction and combination of parts, which will be hereinafter more fully described and claimed, and illustrated in the accompanying drawings, showing the preferred form of our invention, and in which—

Figure 1 is a side elevation of the device. Fig. 2 is a central longitudinal section therethrough. Fig. 3 is a section on the line $x\,x$ of Fig. 1.

Referring to the drawings by numerals of reference, 1 is a tube of any desired material, the lower end of which is inclosed by a perforated disk 2. Secured to the upper end of the tube is a funnel 3, which is provided at points adjacent to the center thereof with a series of perforations 4. A second funnel 5 is secured within and extends slightly above the outer funnel 3. These two funnels are secured together in any suitable manner, as by means of connecting-strips 6. A chamber 7 is formed between said funnels, and air is admitted thereto through the perforations 4 and between the strips 6 and is adapted to flow therefrom, and as the lower ends of the funnels are removed from each other said air is free to pass downward into the tube 1.

When it is desired to separate the cream from the milk, this device is placed into the can containing the liquid and water is poured into the funnel 5. As the water flows down through the tube 1 the suction created thereby will draw air through the perforations 4 and the chamber 6 and will carry the same downward and discharge it at the lower end of the tube. The air by rising to the surface will materially assist the water in separating the cream from the milk, as is obvious.

By arranging the perforations 4 around the funnel 3 the air will be drawn down in equal quantities from all sides thereof.

By providing a perforated disk 2 at the lower end of the tube 1 the water and air are equally distributed over the bottom of the can.

In the foregoing description we have shown the preferred form of our invention, though we do not wish to be understood as limiting ourselves thereto, as we are aware that modifications may be made therein without departing from the spirit or sacrificing any of the advantages thereof, and we therefore reserve to ourselves the right to make such changes as fairly fall within the scope of our invention.

Having thus described the invention, what is claimed, and desired to be secured by Letters Patent, is—

1. The combination with a tube; of a funnel secured to the upper end thereof, an inner funnel secured to the funnel of the tube and having an outlet into said tube, and an air inlet and outlet to the chamber formed between said funnels.

2. The combination with a tube; of a perforated disk encircling the lower end thereof, a funnel secured to the upper end of the tube and having perforations in the sides thereof, a funnel secured within the funnel of the tube and having an outlet into said tube, said funnels forming a chamber therebetween, and an air inlet and outlet to said chamber, the air admitted to the chamber formed between the funnels being adapted to flow into the tube at the inner ends of the funnels.

In testimony whereof we affix our signatures in presence of two witnesses.

WILLARD L. PECKHAM.
JOHN SILVIUS.

Witnesses:
T. D. EVANS,
E. F. BINFORD.